Jan. 26, 1965  G. PASCOE ETAL  3,166,845
APPARATUS FOR PLOTTING TWO DIMENSIONAL DATA
Filed March 29, 1961  2 Sheets-Sheet 1

INVENTORS
GEORGE PASCOE
NORMAN W. HOPWOOD, JR.

BY John L. Faulkner
Thomas H. Oster

ATTORNEYS

Jan. 26, 1965   G. PASCOE ETAL   3,166,845
APPARATUS FOR PLOTTING TWO DIMENSIONAL DATA
Filed March 29, 1961   2 Sheets-Sheet 2

INVENTORS
GEORGE PASCOE
NORMAN W. HOPWOOD, JR.

BY John R. Faulkner
   Thomas H. Oster

ATTORNEYS

United States Patent Office 3,166,845
Patented Jan. 26, 1965

3,166,845
APPARATUS FOR PLOTTING TWO DIMENSIONAL DATA
George Pascoe and Norman W. Hopwood, Jr., Dearborn, Mich., assignors to Ford Motor Company, Dearborn, Mich., a corporation of Delaware
Filed Mar. 29, 1961, Ser. No. 99,160
9 Claims. (Cl. 33—1)

This invention relates generally to a method of plotting coordinate values of a series of points and more particularly to an apparatus which can be readily placed, located, and orientated on a surface of a draft plate to read or plot coordinate values of a series of points on a line inscribed on such a surface with reference to an "X" and "Y" axis.

Conventional methods of plotting a series of points lying on a contour line inscribed on the surface of the draft plate utilize a plotting instrument, generally referred to as a coordinatograph. The coordinatograph may be of a stationary type which is mounted on a table, or a portable unit, in which case, it is necessary to carry it and place it on the surface of the draft plate. A portable coordinatograph is usually limited to scanning an area of approximately four square feet and therefore, requires relocation and reorientation in order to obtain further readings in any additional surface area of the draft plate.

The coordinatograph comprises a frame, an ordinate straight edge, and an abscissa straight edge with movable carriages mounted on guides. The ordinate straight edge, which is normal to the abscissa straight edge, is connected at one end to the abscissa carriage. An optical probe or a mechanical probe such as is disclosed in a copending application Serial No. 99,254 filed on March 29, 1961 attaches to the ordinate carriage. The probe is positioned over a series of points lying on a contour line to be scanned. When the probe is in position, the coordinate values of a point on the contour line can be read on the scales attached to the ordinate and abscissa carriages. These values are then plotted on a corresponding object such as a template sheet.

The readings are repeated for a series of points lying on the contour line until such a line is reproducible to scale on the template sheet.

In the design of sheet metal panels for automobiles, for example, various contour designs are transcribed on metal draft plates by manual means to insure stability of the dimensional design. These draft plates used in automotive body design are made out of $\frac{1}{16}$ inch thick aluminum sheets and are upward to 5 feet wide and 16 feet long. The painted surfaces of these draft plates have equally spaced "X" and "Y" coordinate grid lines scribed thereon. From the draft plate layouts, accurate templates are prepared to facilitate the fabrication of tooling required for the reproduction of sheet metal parts on a high volume basis.

Due to the large size of draft plates used in automobile body drafting, a conventional precision stationary type coordinatograph requires a very large frame to cover the entire surface of the draft plate and therefore, is extremely costly and necessitates the use of considerable floor space. Also, all design work on the draft plate has to be interrupted when the draft plates are moved from their original layout tables to the coordinatograph plotting table.

The current conventional portable type coordinatographs are usually limited to scanning an area of two feet by two feet square. This portable type of coordinatograph is placed directly on the draft plate and then is orientated relative to a selected grid line. Such orientation is tedious, time consuming, and usually requires numerous trial readings along a reference grid line before the plotting instrument is ready for plotting a series of points lying on the contour line inscribed on the draft plate.

After the measurements are completed withi the limited area of operation of the portable type coordinatograph, the instrument has to be lifted and moved to a new location and again be reorientated relative to a new set of grid lines. A very large number of time-consuming operations are therefore required to plot body designs inscribed on full-sized draft plates.

This invention relates to an improvement of a coordinatograph which will accurately locate the measuring instrument in reference to a grid line on the surface of a large draft plate and permit the scanning of the entire surface area of the draft plate without reorientation of the instrument or moving the draft plates to a stationary plotting instrument.

This invention provides for mounting guide wheels on a portable type coordinatograph frame which will facilitate the manual translation of the instrument by guiding it in selected longitudinal grid lines on the draft plate. An anchor stud, which is attached to the coordinatograph frame, is adapted to engage a transverse grid line when the instrument is positioned over the contour line being scanned. After the required series of points are plotted, the anchor stud is released. The coordinatograph is guided along the longitudinal grid lines and repositioned over a new contour line without being reorientated so that a new series of points can be plotted. The anchor stud is engaged with a second transverse grid line to retain the plotting instrument in position.

An object of this invention is to accurately locate the coordinatograph over a contour line to be scanned with reference to a grid line on the draft plate.

A further object is to facilitate the manual translation of the coordinatograph from one area to a second area on the surface of the draft plate without removing the plotting instrument from the surface and without reorientating the instrument with respect to a new "X" and "Y" axis.

Other objects and advantages will become more apparent as this description proceeds, particularly when considered in connection with the accompanying drawings wherein:

FIGURE 7 is an enlarged side elevational view of an integral anchor stud and guide wheel mounting block; and, FIGURE 8 is a plan view of a second embodiment of this invention showing a modified coordinatograph which is capable of scanning the entire width of a draft plate.

Figure 1:
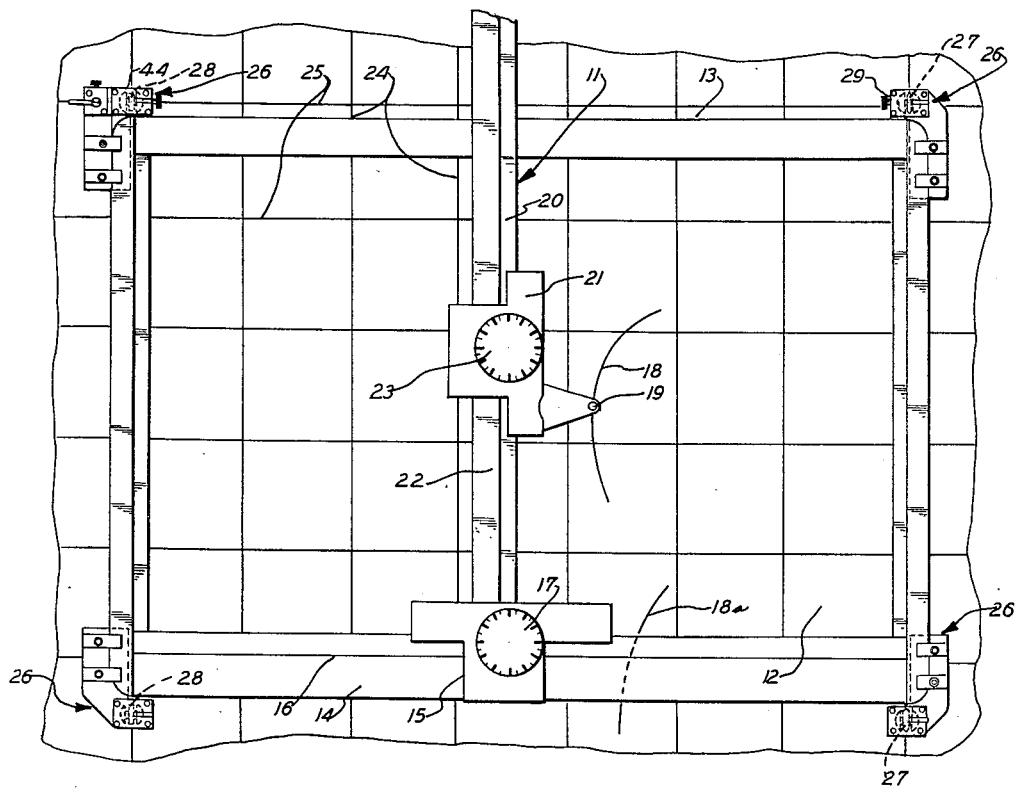
FIGURE 1 is a plan view of a coordinatograph on a draft plate with mounting blocks attached to its frame which rotatably support guide wheels and rollers.

In FIGURE 1 is seen a plan view of a two dimensional plotting instrument, generally called a coordinatograph 11, positioned on the surface of a draft plate 12. The coordinatograph 11 has a rectangular frame 13 with one side of the frame 13 being an abscissa straight edge 14. An abscissa carriage 15, movable along a guide 16, has a rotating dial 17. This dial 17 is calibrated to give a reading of the "X" coordinate value of a point lying on a contour line 18 located by a probe 19 in relation to a given "Y" axis. An ordinate straight edge 20 extending normal to the abscissa straight edge 14 has one end attached to the abscissa carriage 15. An ordinate carriage 21, movable along a guide 22, supports the probe 19 which extends over the surface of the draft plate 12. A second rotating dial 23, which is attached to the ordinate carriage 21, is calibrated to give a reading of the "Y" coordinate value of the point located by the probe 19 in relation to a given "X" axis.

The draft plate 12 has longitudinal 24 and transverse 25 grid lines which are scribed into the surface of the draft plate 12 to a depth of several thousandths of an inch. The grid lines 24 and 25 are spaced at intervals of usually five inches in both directions. As seen in FIGURE 1, the coordinatograph 11 in this instance has four conveying devices 26 attached to its frame 13.

Figure 2:
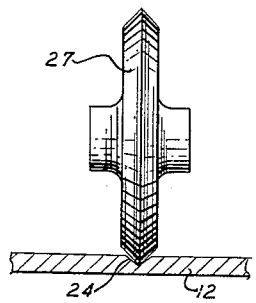
FIGURE 2 is a front elevational view of such a guide wheel.

In FIGURE 2 is seen an enlarged profile view of a V-shaped guide wheel 27.

Figure 3:
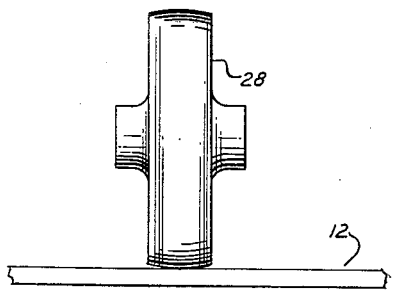
FIGURE 3 is a front elevational view of a support roller.

In FIGURE 3 is seen an enlarged profile view of a support roller 28.

Each conveying device 26 comprises a mounting block 29 which rotatably supports either the V-shaped guide wheel 27 or the slightly crown-shaped support roller 28. At least one of the mounting blocks 29 carries a guide wheel 27, and the remaining mounting blocks 29 carry rollers 28 to provide a stable support for the coordinatograph frame 13 on the surface of the draft plate 12.

The guide wheel 27 is to be of such a configuration so that it is retained in the depression formed by the scribed grid lines 24 and 25 on the surface of the draft plate 12. The V-shaped configuration of the guide wheel 27 brings about a desirable wedge-shaped action in the recessed grid line 24 to prevent the crosswise movement of the frame 13. The roller 28 may have a peripheral surface which is either flat or crown shaped to provide a stable rolling support for the frame 13.

Figure 4:
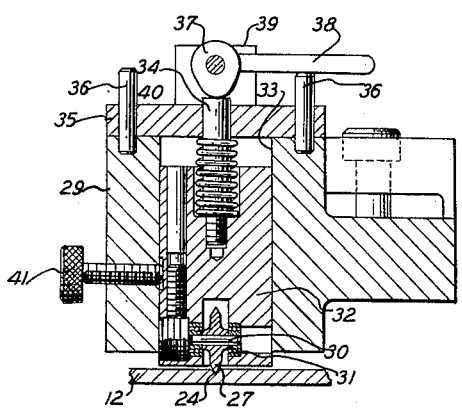
FIGURE 4 is a cross sectional view of a mounting block having an adjustable means for raising or lowering a guide wheel.

In FIGURE 4 is seen an enlarged sectional view of one type of mounting block 29 which either supports the roller 28 or the guide wheel 27 as in this instance. A shaft 30 in the bore of the guide wheel 27 has its ends mounted in a pair of antifriction ball bearings 31 carried by a sliding block 32. The sliding block 32 is fitted into a vertical bore 33 of the mounting block 29. A stud 34, which is attached to the upper end of the sliding block 32, passes through a cover plate 35. The cover plate 35 is fastened to the top surface of the mounting block 29 by two dowel pins 36. A cam 37 with its attached handle 38 is rotatably supported in a bifurcated support 39 mounted on the cover plate 35. The cam 37 engages the top of the stud 34.

Rotation of the handle 38 in a clockwise direction will push the stud 34 and its attached sliding block 32 in a downward direction, thereby raising the frame 13 attached to the mounting block 29 from the surface of the draft plate 12. A spring 40 between the sliding block 32 and the cover plate 35 retains the guide wheel 27 in the recessed grid line 24 or 25. When the handle 38 is rotated in a counterclockwise direction, the bottom surface of the mounting block 29 comes to rest on the surface of the draft plate 12.

By retaining the guide wheel 27 in the grid line 24 or 25, the coordinatograph 11 remains orientated in reference to a selected grid line while readings are being taken. A lock screw 41 in the mounting block 29 retains the sliding block 32 in the vertical bore 33.

Figure 5:
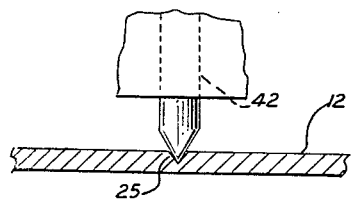
FIGURE 5 is a partial front elevational view of an anchor stud.
Figure 6:
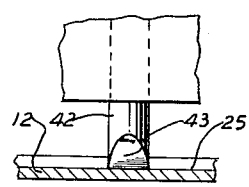
FIGURE 6 is a partial side elevational view of an anchor stud shown in FIGURE 5.

In FIGURE 5 is seen an enlarged partial front elevational view of an anchor stud 42 and in FIGURE 6 is seen an enlarged partial side elevational view of the anchor stud 42. The anchor stud 42, which has a wedge-shaped tip 43, is utilized to retain the coordinatograph 11 in place when it is positioned over the contour line 18. The anchor stud 42 may be mounted in a mounting block similar in design to the adjustable mounting block 29 as seen in FIGURE 4.

In FIGURE 7 is seen a side elevational view of an integral mounting block 44 which may be utilized to support the anchor stud 42 and either a support roller 28 or a guide wheel 27 as in this instance. The integral mounting block 44 of FIGURE 7 will replace two separate mounting blocks 29 required to support each anchor stud 42 and each guide wheel 27 as heretofore discussed.

One method of raising or lowering the anchor stud 42 is also illustrated in FIGURE 7. A handle 45, which has one end pivotally connected to the integral mounting block 44, is also connected intermediate its ends to the anchor stud 42 by a line 46. By manipulating the handle 45, the anchor stud 42 is raised or lowered in relation to recessed grid line 25. The anchor stud 42 may be locked in either position by a lock screw 47.

In the operation of the improved coordinatograph 11 of this invention, the plotting instrument is placed on the surface of the draft plate 12 with its guide wheels 27 engaging a selected longitudinal reference grid line 24. The bottom surfaces of the mounting block 29 and the frame 13 are to be slightly above the surface of the draft plate 12 so that the plotting instrument can be readily translated along the selected reference grid line 24 with a minimum of manual effort until it is positioned over the contour line 18 to be scanned.

When the coordinatograph 11 is in position over the contour line 18, the anchor stud 42 is lowered so that its tip 43 will engage the recessed transverse grid line 25. To assure the stability of the coordinatograph 11 when readings are taken, the frame 13 may also be lowered so that the bottom surfaces of the mounting blocks 29 or integral mounting blocks 44 rest on the surface of the draft plate 12.

After a series of points lying on the contour line 18 are plotted, the frame 13 with its attached mounting blocks 29 is raised by rotating handle 38 in a clockwise direction. Also, the tip 43 of the anchor stud 42 is retracted by raising handle 45. Then the coordinatograph 11 is transferred to a new position over a second contour line 18a seen in FIGURE 1 by manually moving it along the longitudinal grid line 24 engaged by its guide wheel 27. When the coordinatograph 11 is positioned over the new contour line 18a in reference to a transverse grid line 25, the plotting cycle is repeated.

It is to be understood that the coordinatograph 11 of the invention may also be used transversely on the surface of a draft plate 12 by having guide wheel 27 engage a transverse grid line 25 and by anchoring the tip 43 of the anchor stud 42 in a longitudinal grid line 24.

Figure 8:
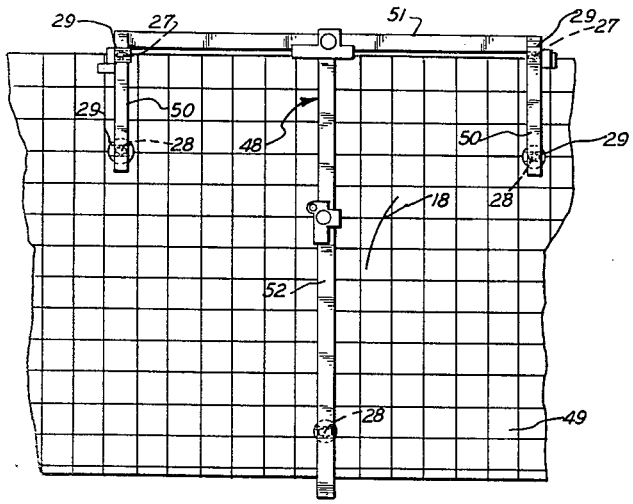
Figure 1:
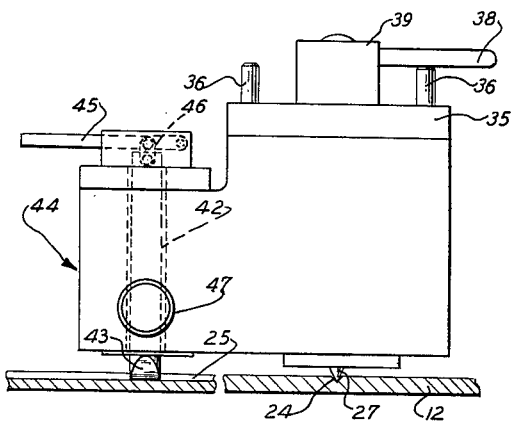

In FIGURE 8 is seen a plan view of a coordinatograph 48 on the surface of a draft plate 49 depicting a second embodiment of this invention. A coordinatograph 48 of this embodiment permits the scanning of the entire width of the full-sized draft plate 49. A rectangular frame 13 of the coordinatograph 11 of the first embodiment is replaced by two cross arms 50 to support an abscissa straight edge 51. An ordinate straight edge 52 has one end rotatably attached to the abscissa straight edge 51 intermediate the cross arms 50. Guide wheels 27 as seen in FIGURE 8 are attached to the cross arms 50 in the immediate vicinity of the abscissa straight edge 51. These guide wheels 27 guide the coordinatograph 48 along the uppermost transverse grid line on the surface of the draft plate 49. Support rollers 28 are rotatably attached to the cross arms 50 and to the ordinate straight edge 52 to stably support the coordinatograph 48 on the surface of the draft plate 49.

Various alternate embodiments involving frame members in combination with mounting blocks can be contrived in order to provide a suitable movable frame for a coordinatograph to facilitate the continuous plotting of contour lines on full-sized draft plates.

We claim:
1. A coordinate measuring apparatus adapted to move a plotting carriage in two dimensions over the surface of a draft plate having a first recessed grid line and a second recessed grid line normal to said first grid line and a con- tour line scribed thereon, said coordinate measuring apparatus comprising a frame, a plurality of mounting blocks attached to said frame, at least two of said mounting blocks adapted to lie over said first grid line, a guide wheel rotatably mounted in each of said two mounting blocks, said guide wheels engaging said first grid line, a support roller rotatably mounted in each of said other mounting blocks, said mounting blocks adapted to support said frame on the surface of said draft plate, and an anchoring means capable of anchoring said coordinate measuring apparatus on said second grid line, thereby positioning said measuring apparatus with respect to the contour line on the surface of said draft plate.

2. A coordinate measuring apparatus adapted to move a plotting carriage in two dimensions over the surface of a draft plate having a recessed first grid line and a recessed second grid line normal to said first grid line and a contour line scribed thereon, said coordinate measuring apparatus comprising a plurality of mounting blocks attached to a frame, a guide wheel rotatably mounted in one of said mounting blocks, said guide wheel adapted to guide said apparatus along said first grid line, a support roller rotatably mounted in a second of said mounting blocks, said support roller adapted to support said frame on the surface of said draft plate, and an anchor device attached to said frame, said anchor device having a tip adapted to be confined in said second grid line to position said apparatus with respect to the contour line on the surface of said draft plate.

3. An apparatus as described in claim 2 and which is further characterized in that the peripheral surface of said guide wheel is adapted to be retained in said recessed first grid line when being rotated.

4. An apparatus as described in claim 2 and which is further characterized in that said guide wheel has a peripheral portion that is V-shaped in section, said V-shaped peripheral portion being adapted to provide a wedge action in said recessed first grid line.

5. A coordinate measuring apparatus adapted to move a plotting carriage in two dimensions over the surface of a draft plate having a first recessed grid line and a second recessed grid line normal to said first grid line and a contour line scribed thereon, said coordinate measuring apparatus comprising a frame, a plurality of mounting blocks attached to said frame, at least two of said mounting blocks lying over said first grid line, a guide wheel rotatably mounted in each of said two mounting blocks, said guide wheel adapted to engage said recessed first grid line, a supoprt roller rotatably mounted in each of said other mounting blocks, an anchor stud attached to said frame, said anchor stud being provided with a tip and an adjusting means to raise or lower said tip, said anchor stud being lowered when said frame is positioned over the contour line on the surface of said draft plate, said tip of said anchor stud when lowered adapted to be confined in the recessed second grid line.

6. The apparatus as described in claim 5 and which is further characterized in that said tip of said anchor stud is wedge shape.

7. A coordinate measuring apparatus adapted to move a plotting carriage in two dimensions over the surface of a draft plate having a recessed first grid line and a recessed second grid line normal to said first grid line and a contour line scribed thereon, said coordinate measuring apparatus comprising a frame, a plurality of mounting blocks attached to said frame, at least two of said mounting blocks lying over said first grid line, a guide wheel rotatably mounted in each of said two mounting blocks, said guide wheel adapted to engage said recessed first grid line, a support roller rotatably mounted in each of said other mounting blocks, an anchoring device attached to said frame, a first adjusting means adapted to raise or lower said anchoring device, a second adjusting means, said second adjusting means adapted to raise or lower said frame, said frame when lowered adapted to rest on the surface of said draft plate, said guide wheels and said anchoring device adapted to be retained in said grid lines when said frame is lowered.

8. A coordinate measuring apparatus adapted to move a plotting carriage in two dimensions over the surface of a draft plate having a recessed first grid line and a recessed second grid line normal to said first grid line and a contour line scribed thereon, said coordinate measuring apparatus comprising a frame, said frame having a first straight edge and a second straight edge, said second straight edge being normal to said first straight edge with one end of said second straight edge slidably attached to said first straight edge intermediate its ends, a crossarm attached to each end of said first straight edge, a plurality of mounting blocks attached to said crossarm, a guide wheel rotatably mounted in at least one of said mounting blocks attached to each of said crossarms, said guide wheel adapted to engage said first grid line, a support roller rotatably mounted in at least one of said other mounting blocks, and a support means attached to said second straight edge.

9. A coordinate measuring apparatus adapted to establish the coordinate value of a point lying on the surface of a draft plate having at least two recessed grid lines, said coordinate measuring apparatus including conveying means having portions thereof received within one of said grid lines to guide said measuring apparatus along said one grid line, and an operable anchoring means, said anchoring means operative to anchor said coordinate measuring apparatus in the other of said grid lines thereby positioning said measuring apparatus with respect to the point lying on the surface of said draft plate.

References Cited by the Examiner
UNITED STATES PATENTS
2,873,535  2/59  Gordon et al. _____ 33—189

ISAAC LISANN, *Primary Examiner.*